(12) United States Patent
Washington

(10) Patent No.: US 6,389,171 B1
(45) Date of Patent: May 14, 2002

(54) METHOD AND APPARATUS FOR A DIGITAL VIDEO CASSETTE (DVC) DECODE SYSTEM

(75) Inventor: Richard Gene Washington, Marblefalls, TX (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/134,700

(22) Filed: Aug. 14, 1998

(51) Int. Cl.$^7$ .............................. G06K 9/36; G06K 9/46
(52) U.S. Cl. ...................... 382/233; 382/246; 382/250
(58) Field of Search ................................ 382/232, 233, 382/234, 235, 237, 248, 250, 304, 305; 348/387, 395, 403, 404, 419, 420, 425; 358/536, 428, 261.1, 261.2, 261.3, 427, 430, 432; 386/37, 40, 56, 83, 90, 109, 112, 124, 125; 395/200.45, 200.77, 888, 728; 341/67

(56) References Cited

U.S. PATENT DOCUMENTS 5,841,937 A * 11/1998 Shima et al. .................. 386/40
5,946,352 A * 8/1999 Rowlands et al. .......... 375/242
6,157,410 A * 12/2000 Izumi et al. ................. 348/445

OTHER PUBLICATIONS

Thomas "Rick" Tewell, "DV Coding: How it works with IEEE–1394", pp. 1–11, 1997.*
Roger Jennings, "Consumer and Professional Digital Video (DV) Recording and Data Formats", pp. 1–17, 1995.*
International Standard CEI/IEC 61883–2, 1998–02, Consumer audio/video equipment–Digital interface. 10 pages.
International Standard CEI/IEC 61834–2, 1998–08, Helical–scan digital video cassette recording system using 6,35 mm magnetic tape for consumer use. 134 pages.

* cited by examiner

Primary Examiner—Phuoc Tran
(74) Attorney, Agent, or Firm—Blakely, Sokoloff, Taylor & Zafman LLP

(57) ABSTRACT

A system for decoding variable length coded DVC data and methods of operating the same result in a variable length decoder engine that receives video frames having a plurality of digital interchange format (DIF) sequences and provides contiguous decoded run-length amp pairs. The variable length decode engine comprises a concatenation engine configured to contiguously format a plurality of DIF blocks of a DIF sequence to provide contiguous DCT blocks. The concatenation engine has a controller that utilizes several passes capable of running simultaneously to return the DIF blocks coded according to IEC standards to their original variable length sequences. A run-length amp pair generator coupled to the concatenation engine configured to decode the contiguous DCT blocks to provide the run-length amp pairs.

28 Claims, 11 Drawing Sheets

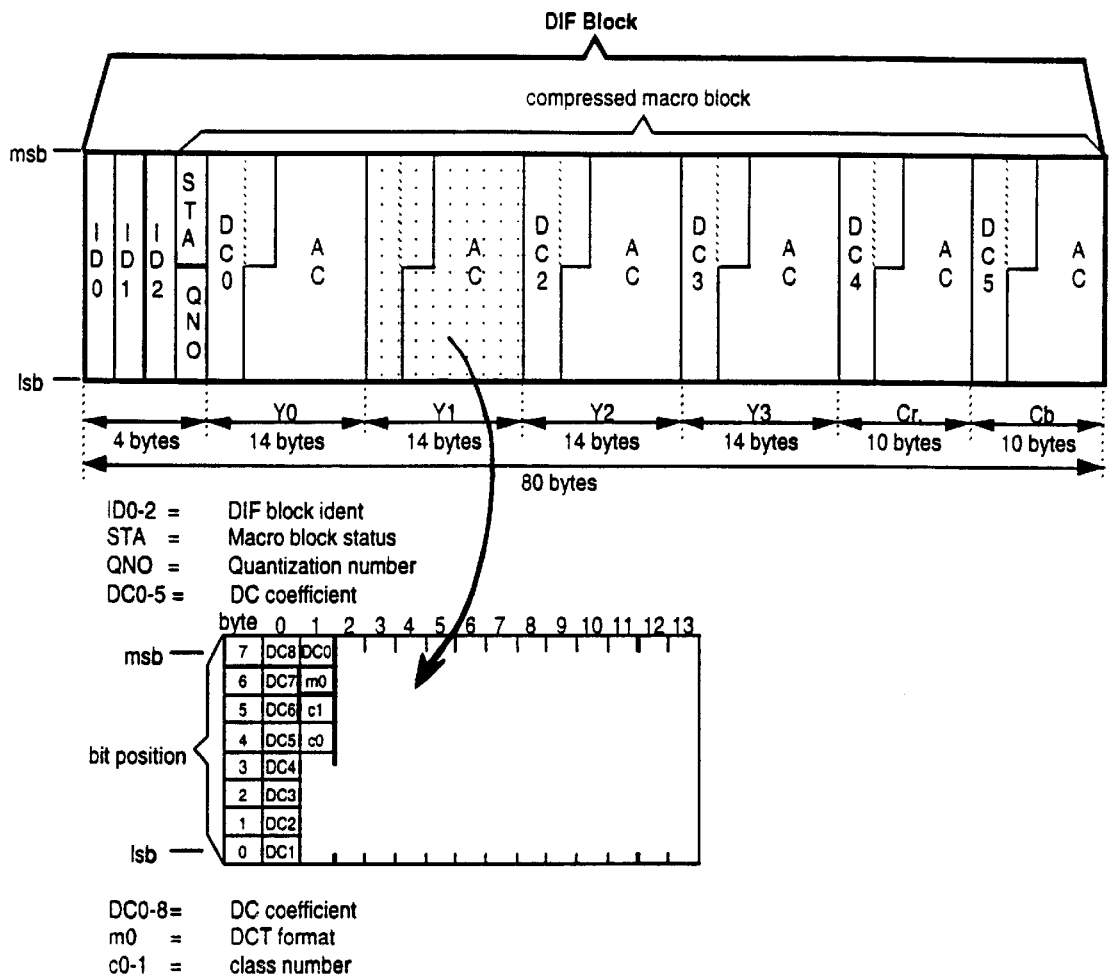
Fig. 9 (previous art)

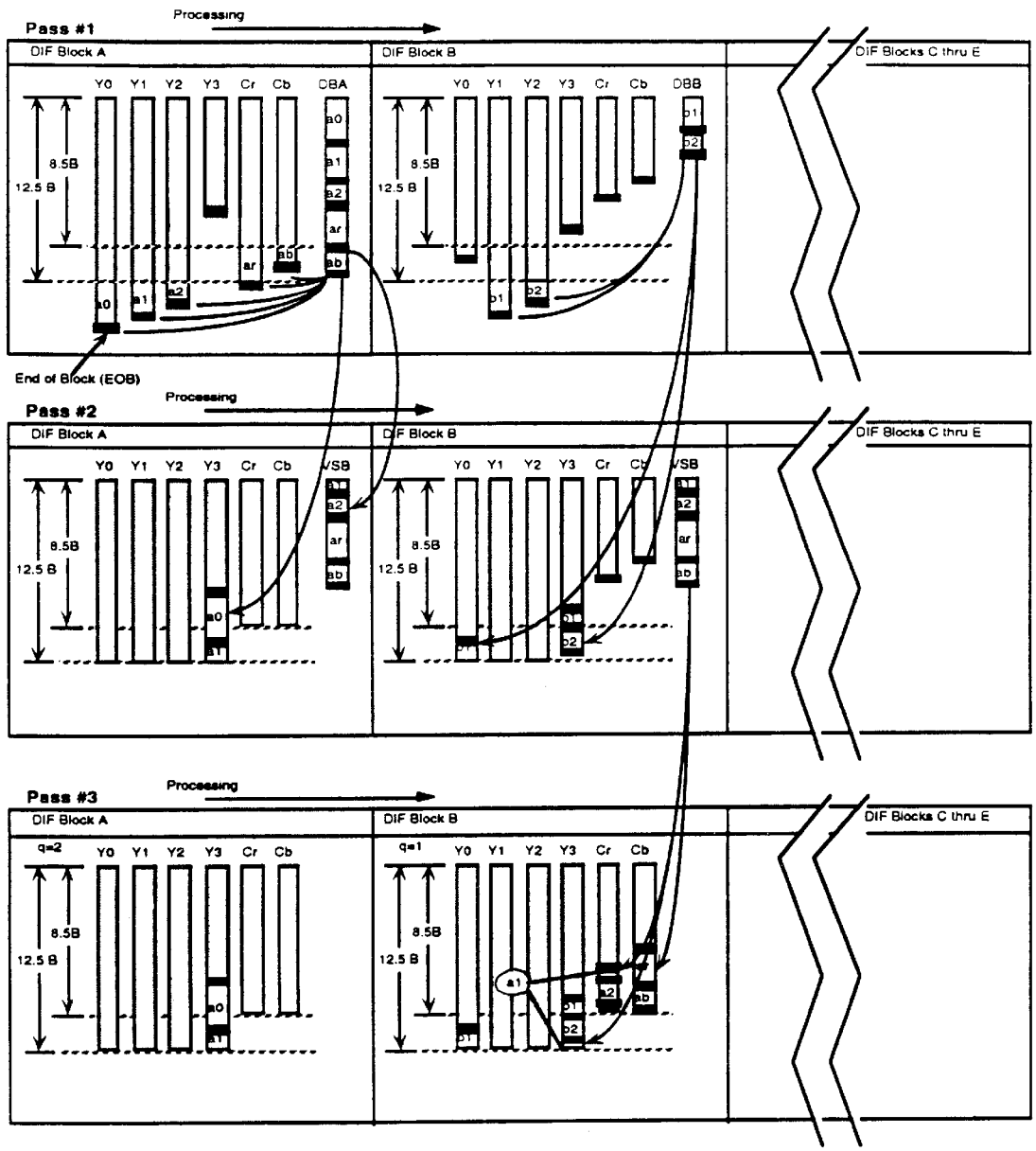
Fig. 10 (previous Art)

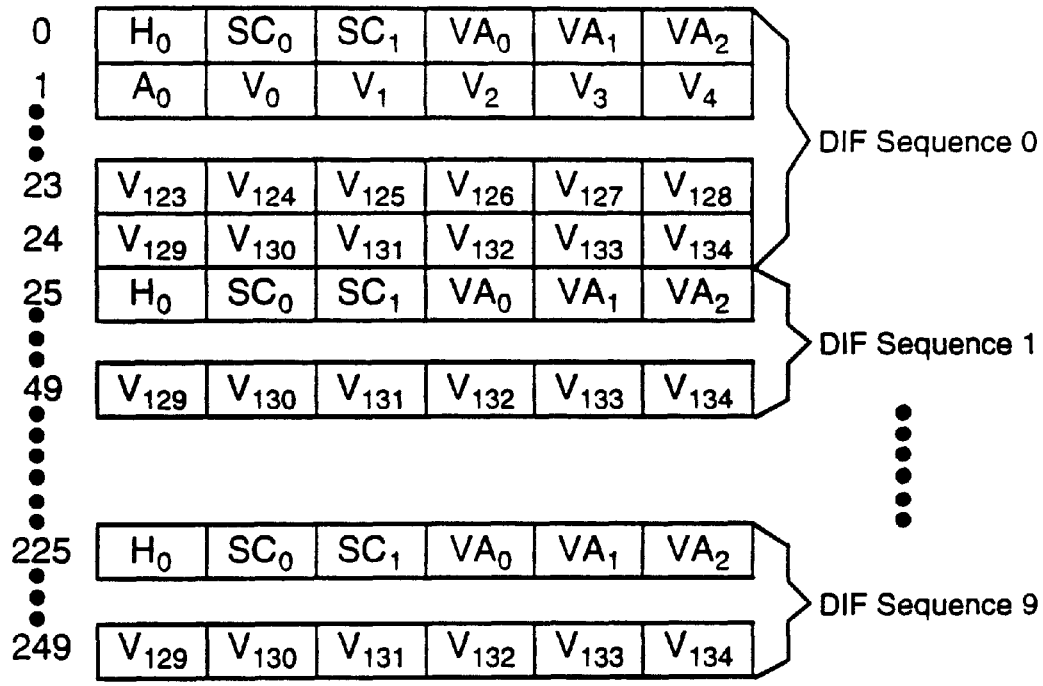
Fig. 11 (previous art)

METHOD AND APPARATUS FOR A DIGITAL VIDEO CASSETTE (DVC) DECODE SYSTEM

BACKGROUND OF THE INVENTION

1. Field of the Invention

The present invention relates to decoding of Digital Video Cassette video images and more particularly to decoding variable length coded data to provide a data stream of decoded data.

2. Description of the Related Arts

As computers become more and more powerful, the fascination of consumers and professionals alike with digital graphics becomes more and more acute. Digital graphics enable users to manipulate, transfer and store the digital graphics as data files on computers. Digital cameras are one of the first devices to take advantage of digital capture without demanding an intermediate step of first scanning the particular graphic depiction. On the heels since the introduction of the digital cameras are digital video recorders. Albeit the current prices for digital video recorders are not for the average consumer or even professional, there is still an outpouring of next generation digital video camcorders that are available. However, as the digital video camcorders become more widely accepted, the prices of the digital camcorders will drop allowing many consumers to afford the digital camcorders.

One inherent impasse of the digital video camcorders or even digital cameras is converting and reconverting the mass amount of data that represents the recorded digital images to a computer system where the user of the computer system can manipulate, transfer, or store the digital images. Thus, sophisticated encoding techniques have been developed to encode the ever increasing digital information into an ever smaller space in efforts to make digital cameras and digital camcorders more attractive for the users. Some of the digital image encoding techniques include JPEG, MPEG I and II. DVC or digital video (DV) is another encoding technique. Given the goal of digital image encoding is to encode as much data into as little of space as possible without losing detailed information, the DVC encoding technique produces variable length coding to produce more efficient coding. The variable length coding distributes coded data throughout a fixed encoded data structure. The hierarchy of the DVC coded building blocks is as follows: Video Frame (720×480 NTSC, 720×576 PAL)

DIF (Digital Interchange Format) Sequence (10 DIF Sequences per frame for NTSC, 12 for PAL)

Super Block (5 per DIF Sequence)

Video Segment (consists of 5 macro blocks or DIF blocks, 27 per DIF Sequence)

Macro or DIF Block (typically represents an 8×32 pixel area for NTSC, and a 16×16 pixel area for PAL)

Luminance and Chrominance Difference DCTs (4 luma (Y) and 2 chroma (Cr, Cb) per DIF block).

The variable length coding process for DVC is similar to other DCT based compression algorithms such as JPEG or MPEG. After quantization the AC coefficients are run length encoded which results in a series of run length-amplitude pairs. Run length refers to the number of consecutive zero AC coefficients, and amplitude refers to the amplitude of the AC coefficient at the end of the run of zero coefficients (e.g. run 3, amplitude 12 represents 3 zero amplitude coefficients followed by a coefficient amplitude equal to 12). The variable length code word associated with each run-amplitude pair is determined by a fixed Huffman table (Table 25, Helical-scan digital videocassette recording system using 6.35 mm magnetic tape for consumer use, IEC 61834-2 Part 2) page 169. For each DCT the dc coefficient, the variable length codewords, and an end of block (EOB) codeword are concatenated together to form the core of a variable length data stream.

Once the DCT data has been coded as an encoded data stream consisting of the dc coefficient, variable length codewords, and an EOB, the encoded data stream is stored into the fixed encoded data structure based on the hierarchy of the DVC encoded building blocks. The basic element of the fixed data structure is a DIF block that is shown in FIG. 9. The DIF block consists of a compressed macro block and three bytes, ID0–ID2. The three bytes ID0–ID2 identify the position of the compressed macro block in the data stream. Each compressed macro block includes data associated with 4 luminance (Y0–3) and 2 chroma difference (Cr, Cb) DCTs. Each DCT component starts with a 1.5 byte header consisting of a dc coefficient value, class number, and a DCT m0 bit. The DCT m0 bit indicates whether the DCT mode is the standard 8×8 DCT or a dual 4×8 (2–4×8) DCT.

FIG. 9 is deceiving because it implies that all of the data associated with a particular DCT, such as Y0, is stored in the area marked Y0. The actual data distribution of the DCT components is significantly more complex. A three pass encoding of the DCT components distributes the variable length coded data associated with a particular DCT component. In some cases the variable length coded data associated with a particular DCT component can be distributed with other DCT components.

The first pass attempts to place the variable length coded data associated with a particular DCT in an area assigned to that DCT (e.g. luminance DCT Y0's data would go into the DCT area labeled Y0). The luminance areas of the DIF block are allocated 12.5 bytes and the chrominance areas of the DIF block are allocated 8.5 bytes. The variable length coded data which is not stored in the allocated areas for the first pass is concatenated into individual DIF block overflow buffers (e.g. overflows from Y0 through Cb for DIF block 0 is stored in a DIF block 0 overflow buffer, Y0 through Cb for DIF block 1 is stored in a DIF block 1 overflow buffer, etc.).

For the second pass the data in the overflow buffers is distributed back into any free area in the associated DIF block (e.g. a Y0 overflow for DIF block 0 could go into any empty area left in Y1 through Cb in DIF block 0). Any coded data which cannot be placed back into the DIF block by this pass is concatenated into a single global overflow buffer, referred to as the video segment buffer (VSB).

For the third and final pass the coded data contained within the global buffer is distributed into any remaining unused area within the video segment.

FIG. 10 provides an example of the three pass encoding of the DCT components for the first two DIF blocks (macro blocks) of a video segment. The variable length coded AC coefficients for each DCT start as a variable length structure with an end of block (EOB) code concatenated to the end of the data. For DIF Block A, any code data exceeding 12.5 bytes for each of Y0, Y1, and Y2 and exceeding 8.5 bytes for Cr and Cb is placed into a buffer labeled DBA. For DIF Block B, the excess coded data for Y1 and Y2 is placed into a buffer labeled DBB. In pass 2 of the variable length coding, part of the coded data from DBA is placed back into DIF Block A. Because there is not enough space to contain all of the coded data, the excess coded data is stored into the video segment buffer (VSB). For DIF Block B, all of the coded data temporarily stored in DBB is absorbed back into the DIF block B, hence no additional data is added to the VSB buffer. During pass 3 the coded data left in VSB is placed into the open area that remains in DIF Block B.

To insure that the coded data fits in the allocated area during encoding, adjustment of the quantization levels for the AC coefficients controls the variable length coded data size. For example, as the quantization of the upper frequency AC coefficients gets more coarse (less granular) more of the AC coefficient values will drop to zero. Thus, the variable length coding process becomes more efficient as more AC coefficients drop to zero which results in a reduced storage requirement. However, some fine details for the original picture may be lost if too many AC coefficients values drop to zero.

The audio encoding for the DVC process is fairly straightforward providing for a 2's complement representation of each audio sample for the 48 k, 44.1 k, and 32 k one channel modes (where, for example, 48 k represents a 48 kHz sampling rate and one channel means one stereo channel which is composed of a left and right source). There is also a 32 k two channel mode where each 16 bit audio sample undergoes a nonlinear compression down to 12 bits. The complete audio description is not included for the sake of brevity. Moreover, the present invention of a Variable Length Decode (VLD) engine skips over the non-video sections although system, audio, and video data is included in the input stream.

Once the audio and video have been coded, the variable length coded data is muxed with audio auxiliary, video auxiliary, and system data to form a data structure shown in FIG. 11. A set of 6 DIF blocks forms a single source packet used for isochronous transmission over firewire™. Firewire™ originally by Apple Computer, Inc. in 1995 and now standardized by the Institute of and Electronic Engineers as IEEE 1394-1995 is a high performance serial bus for digital/video interconnection. A set of 25 source packets is grouped into a single DIF sequence. The general structure of a DVC DIF sequence is defined in Part 2 of the Consumer audio/video equipment Digital interface, IEC 61883-2. The format shown in FIG. 11 is for NTSC; however, PAL is the same except that 12 DIF sequences (0.11) are used instead of the 10. Each DIF sequence contains the audio, video, and auxiliary data for 34,560 pixels of a video frame regardless of the video format (NTSC or PAL).

Given that the distribution of the variable length coded data associated with the DCT components can be interdispersed within a video segment such that the variable length coded AC coefficient areas can contain variable length coded data from other DCTs, decoding the interdispersed variable length coded data stored within the video segments presents a challenge and can demand considerable amounts of time and computing resources. Furthermore, conventional processing of the serial nature of the decode process requires that the variable length coded data be first shifted in and the length of the valid code determined before additional decoding can occur which severely limits decoding efficiency and the ability for parallel processing of the decode process. Therefore, it is desirable to provide an efficient apparatus and method of operating the same which decodes the variable length coded DVC data.

SUMMARY OF THE INVENTION

The present invention provides an apparatus for variable length decode (VLD) engines and methods for operating the same which result in improved performance of DVC decoder systems. The novel VLD engine is based on reconstructing overflow buffers associated with the variable length coded AC coefficient areas. Thus, according to one aspect of the invention, the VLD engine is operative to receive a video frame having a plurality of digital interchange format (DIF) sequences including a plurality of embedded AC coefficients and comprises a concatenation engine configured to contiguously format a plurality of DIF blocks of a DIF sequence to provide contiguous DCT blocks. A run-length amp pair generator is coupled to the concatenation engine configured to decode the contiguous DCT blocks to provide run-length amp pairs. The run-length amp pair includes a codeword having a run-length representing a number of consecutive zero AC coefficients and an amplitude representing a magnitude of a non-zero AC coefficient.

According to another aspect of the invention, a DIF sequence data storage is configured to store a plurality of DIF blocks having a plurality of DCT components. The concatenation engine includes a pass 1 engine coupled to the DIF sequence data storage to detect a DCT component and store remaining DCT components to a pass 2 overflow storage register of the DIF sequence data storage. A pass 2 engine is coupled to the pass 2 overflow storage register to detect complete DCT components from the remaining DCT components of the pass 2 overflow storage register and store incomplete DCT components to a pass 3 overflow storage register of the DIF sequence data storage. A pass 3 engine is coupled to the DIF sequence data storage, the pass 2 overflow storage register, and the pass 3 overflow storage register to contiguously format the plurality of DIF components from the DIF sequence data storage, the pass 2 overflow storage register, and the pass 3 overflow storage, respectively to provide the contiguous DCT blocks. The pass 1 engine, the pass 2 engine, and the pass 3 engine operate in parallel which provides even more efficient decoding of the variable length coded DVC data.

An apparatus and method for operating a VLD engine are provided whereby the VLD engine decodes variable length coded DVC data to provide codewords having run-length amp pairs. Improved decoding performance is achieved through reducing the number accesses to the DIF sequence data storage, maintaining data word boundaries for accesses to the DIF sequence data storage, and having separate working buffer areas for the pass engines.

Other aspects and advantages of the present invention can be seen upon review of the figures, the detailed description, and the claims which follow.

BRIEF DESCRIPTION OF THE DRAWING

FIG. 9 illustrates a DIF block structure.

FIG. 10 illustrates variable length coded AC coefficient distribution.

FIG. 11 illustrates NTSC transmission source packets.

DETAILED DESCRIPTION OF THE INVENTION

Figure 1:
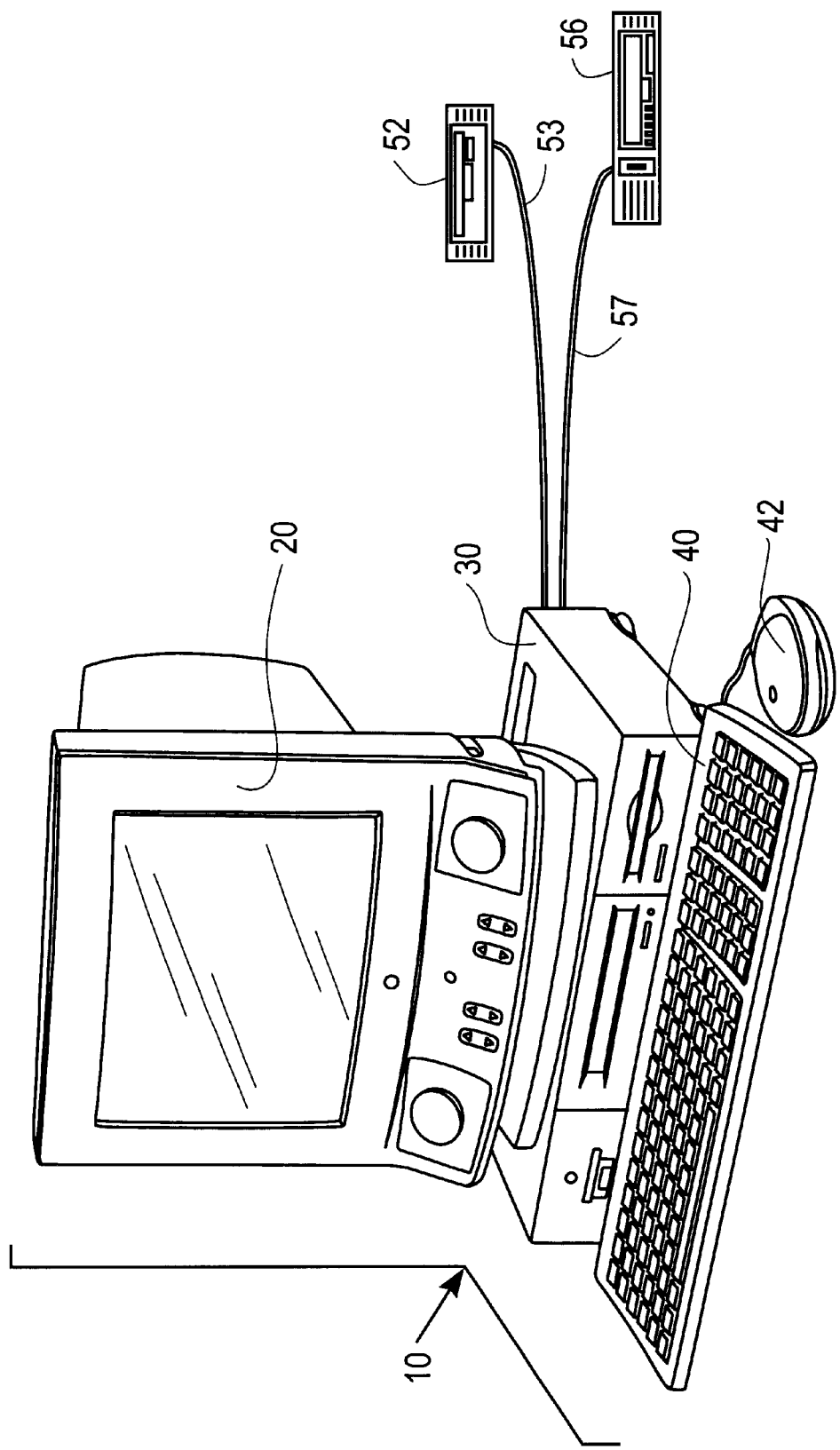
FIG. 1 illustrates an example of a computer system in accordance to the present invention.

The invention will be described with respect to the Figures in which FIG. 1 generally shows a computer system 10. The computer system 10 includes a display 20, an enclosure 30, a keyboard 40, a mouse 42, a digital video cassette (DVC) device 52, and a digital video cassette recorder (D-VCR) 56. The display 20 is coupled to the enclosure 30 and provides a video display in response to output signals from the enclosure 30. The enclosure 30 provides the "brains" and processing for the computer system 10. The enclosure 30 includes a peripheral component interface (PCI) bus to which a central processing unit (CPU), audio card, video card, memory, data storage device, and an audio output device such as a speaker are coupled. The PCI bus provides an interface for these components and other PCI based cards to the computer system 10. The keyboard 40 and the mouse 42 are coupled to the enclosure and provides inputs to various components within the enclosure 30. The DVC device 52 is coupled to a firewire™ 53 for transceiving DVC coded data to and from the enclosure 30 for processing. Firewire™ originally by Apple Computer, Inc. in 1995 and now standardized by the Institute of and Electronic Engineers as IEEE 1394-1995 is a high performance serial bus for digital/video interconnection. The enclosure 30 includes circuitry for processing the DVC coded data for display on the display 20. Moreover, the D-VCR 56 is coupled to a firewire™ 57 for transceiving decoded audio/video data to and from the enclosure 30. Thus, the D-VCR 56 records the decoded audio/video data for future playback on other video systems such as a television, video monitor, or another computer system.

An exemplified operation of the computer system 10 begins with the loading of an operating system from data stored on its data storage device or an external source to the memory of the computer system 10. The CPU executes program applications and commands in response to the data stored on the data storage device, data externally received from input ports, and commands from the keyboard or mouse. The results of the program applications and commands are provided to the output ports for the display 20, or to the other output devices attached to the enclosure 30. Thus, the computer system 10 operates like a generic computer well known in the art.

Figure 2:
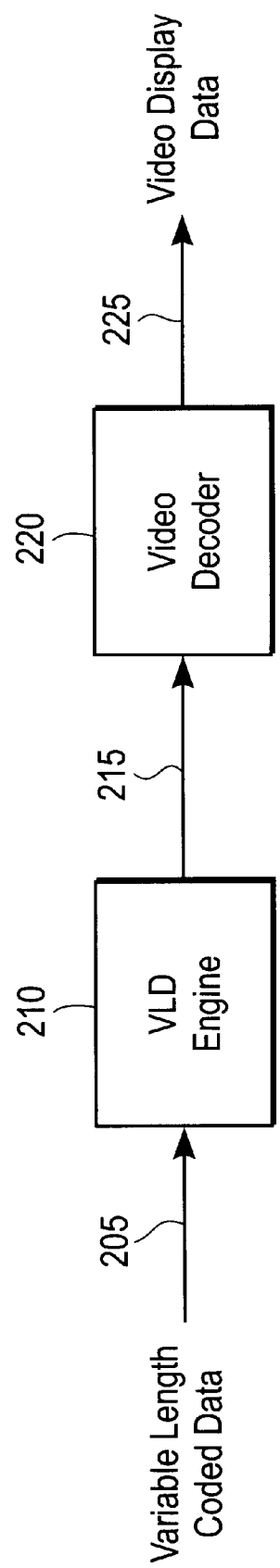
FIG. 2 illustrates a simplified block diagram of a video decoding system in accordance to the present invention.

FIG. 2 illustrates a simplified block diagram of a system for decoding DVC coded data according to the present invention. The system includes a (variable length decode) VLD engine 210 and a video decoder 220. The VLD engine receives variable length coded data on line 205. The VLD engine 210 skips non-video DIF blocks and processes variable length coded video data from the VLD coded data. The VLD engine 210 reformats the variable length coded data to provide contiguous inverse quantized run length and amplitude pairs which are used to create DCT blocks. The video decoder 220 receives run length and amplitude pairs on line 215, expands the run length and amplitude pairs to fill the 8×8 DCT block, and performs the inverse DCT function to provide the resultant digital video data on line 225.

According to the present embodiment of the invention, the VLD engine 210 includes an application specific integrated circuit (ASIC) code named Ember that provides front end processing of the variable length coded data for the video decoder 220, a Phillips Trimedia Processor (TM-1).

Figure 3:
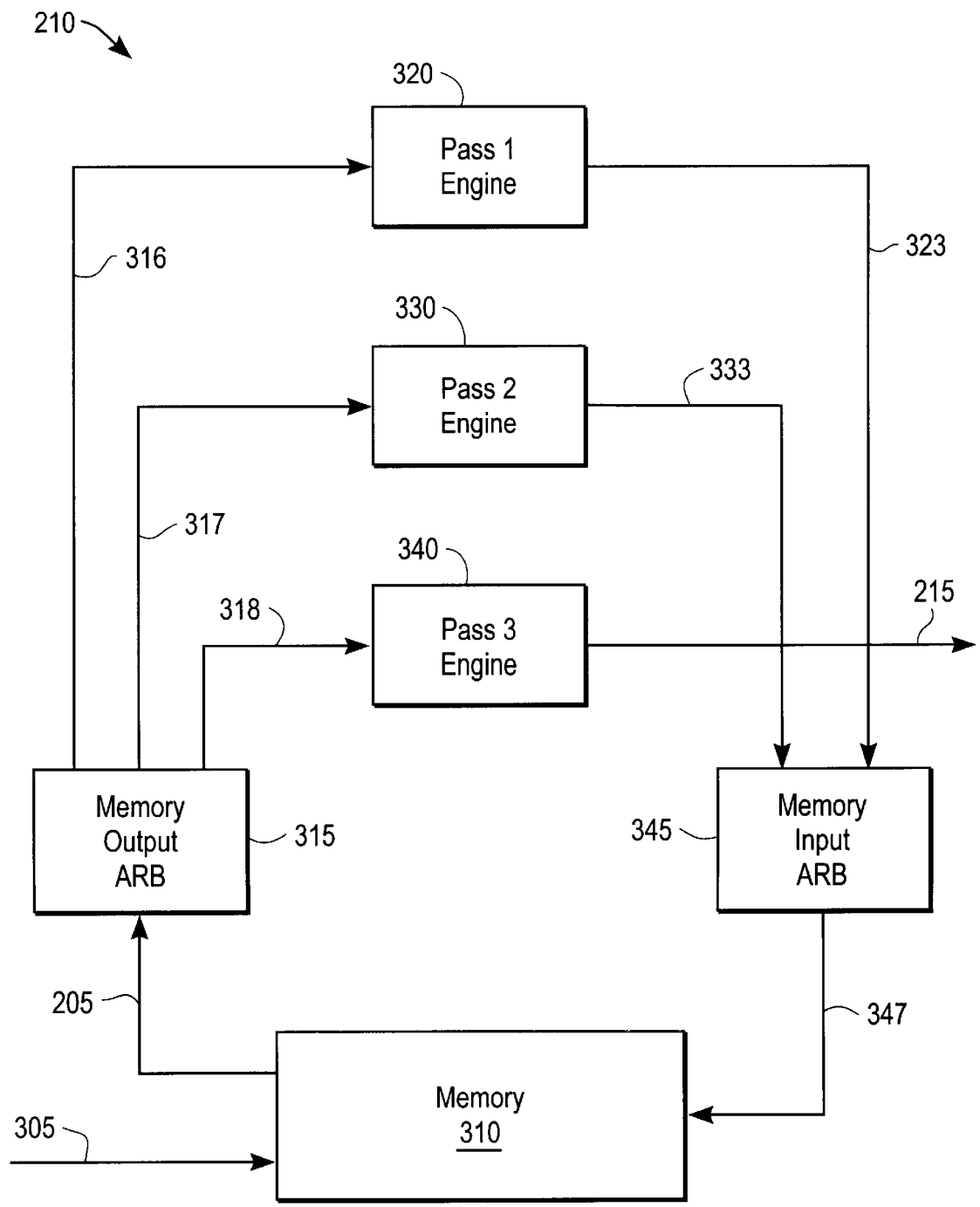
FIG. 3 illustrates a block diagram of a VLD engine and a memory for the computer system 10 in accordance to the present invention.

FIG. 3 illustrates a simplified block diagram of the VLD engine 210 and a memory 310 for the computer system 10. The VLD engine 210 includes a memory output arbitrator 315, a pass 1 engine 320, a pass 2 engine 330, a pass 3 engine 340, and a memory input arbitrator 345. Variable length coded data are loaded to the memory 310 on line 305. The VLD engine 210 receives the variable length coded data that is composed of individual variable length fields each representing a Huffman codeword. The VLD engine 210 reformats the variable length coded data to provide codewords having contiguous DCT blocks and maps each codeword into a value representing a run length and amplitude. The contiguous DCT blocks include the completed set of DCTs. Codeword values are defined in Part 2, Table 25 of the DVC specification in the Helical-scan digital video cassette recording system using 6.35 mm magnetic tape for consumer use, IEC 61834-2. In general, the codewords are from 3 bits to 16 bits in length.

Referring to FIG. 3, the memory 310 receives the variable length coded data having a plurality of digital interchange format (DIF) sequences on line 305. According to the present embodiment, the VLD engine 210 operates on a particular video segment at a time. A video segment includes five DIF blocks and each DIF block include six DCT components or DCTs. The pass 1 engine 320 retrieves a video segment stored in the memory 310 via the memory output arbitrator 315 on line 205 and line 316 and searches for an end of block (EOB). The EOB identifier is a special 4 bit code (0110) and signifies the end of a DCT component. Each DCT component has an associated EOB which acts as a data delimiter for the variable length stream. Once the pass 1 engine 320 detects an EOB, the pass 1 engine 320 stores the remaining DCT component area data (if any) to a pass 2 overflow storage area in the memory 310 via the memory input arbitrator 345 on line 323 and line 347. The pass 1 engine 320 also flags detection of the completed DCT component as well as storing the state of the uncompleted DCT components.

The pass 2 engine retrieves the DCT overflow data stored in the pass 2 overflow storage area via the memory output arbitrator 315 on lines 205 and 317 and attempts to finish any uncompleted DCT components via concatenation of this overflow data with the unfinished DCT whose state was stored by Pass 1. The DCT is "finished" when an EOB is detected (i.e. each DCT component has an associated EOB which acts as a data delimiter in the variable length data. As the pass 2 engine 330 detects the DCT components, the pass 2 engine flags the completed DCT components. The pass 2 engine 330 stores the state of the incomplete DCT (i.e. the remains of the last unrecoverable code and where it occurred in the data stream). If all DCT components are completed for a particular macro block the remaining data is stored in a pass 3 overflow storage area in the memory 310 via the memory input arbitrator 345 on lines 333 and 347.

The pass 3 engine 340 retrieves the video segment that was used by the pass 1 engine 320 via the memory output arbitrator 315 on lines 205 and 318 and detects DCT components and run-length amplitudes associated with the variable length code. The pass 3 engine 340 also inverse quantizes the AC coefficients of the DCT components and generates an output data stream on line 215. Once the pass 3 engine 340 completes the search of the video segment searched during pass 1 by the pass 1 engine, the pass 3 engine 340 retrieves the pass 2 overflow storage and searches for additional DCT components. Once the pass 2 overflow storage is searched, the pass 3 engine 340 retrieves the pass 3 overflow storage to complete the detection of DCT components for the video segment.

By searching the same video segment already stored in the memory 310 during pass 3 as pass 1, the size of memory 310 and the number of memory accesses due to data copying is reduced. Cost savings associated with a larger memory and speed gains associated with reduced data copying are realized in the present implementation of the VLD engine 210.

Figure 4:
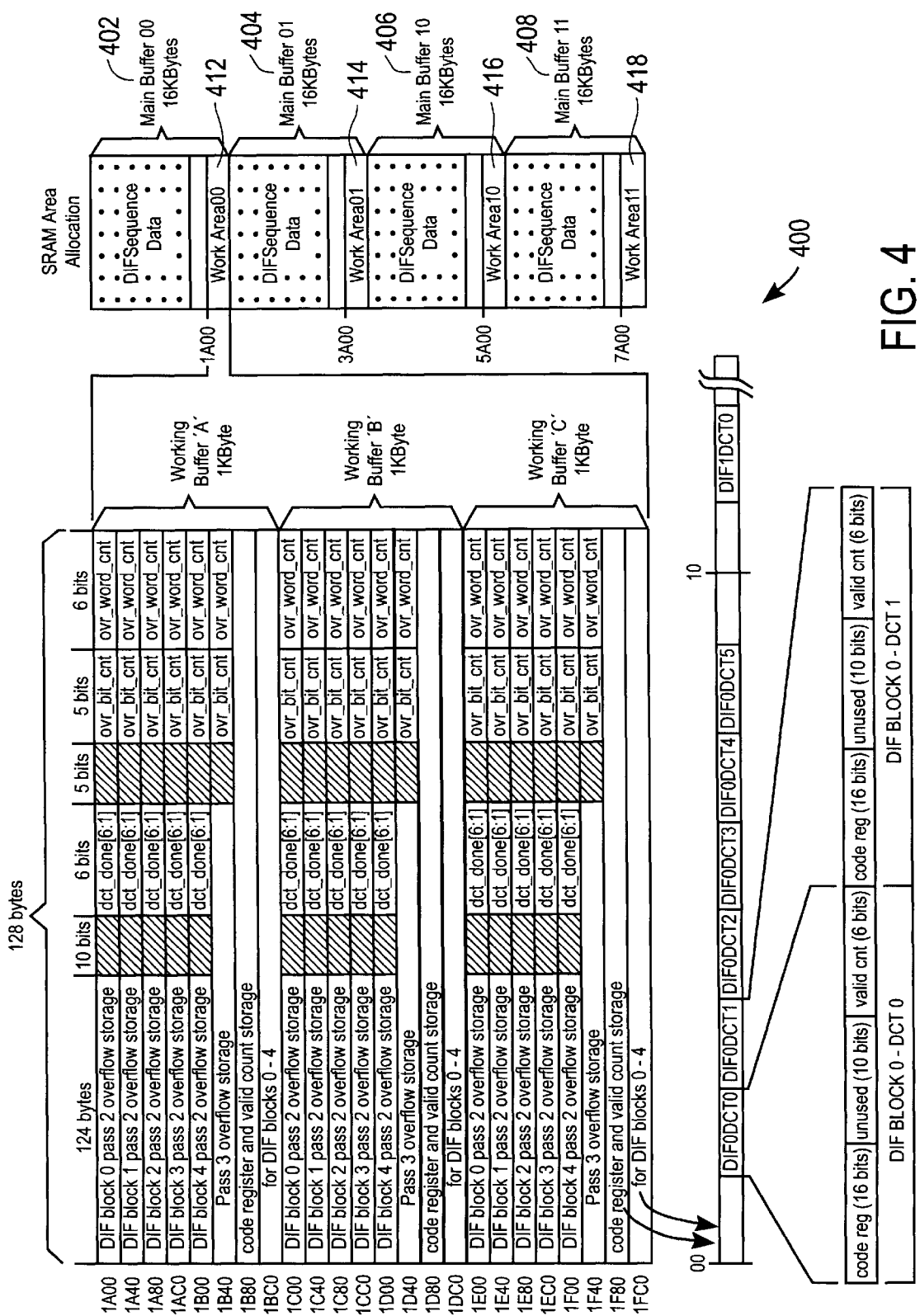
FIG. 4 illustrates a memory map of the DIF sequence data storage in accordance to the present invention.

FIG. 4 illustrates a memory map 400 of the memory 310 for the VLD engine 210. The memory map 400 includes a first DIF sequence data storage area 402, a second DIF sequence data storage area 404, a third DIF sequence data storage area 406, and a fourth DIF sequence data storage area 408. Thus, the memory 310 accommodates storage of four DIF sequences. Each DIF sequence data storage area includes a work area. The first DIF sequence data storage area 402 includes a work area 412; the second DIF sequence data storage area 404 includes a work area 414. The third DIF sequence data storage area 406 includes a work area 416, and the fourth DIF sequence data storage area 408 includes a work area 418.

The work area 412 of the DIF sequence data storage area 402 is shown expanded so that registers of the work area 412 is more fully described. The work areas 414, 416, and 418 each include similarly configured registers as the work area 412. The work area 412 includes a working buffer area A, a working buffer B, and a working buffer C that are similarly configured. Thus, the description for working buffer A also applies to working buffer B and working buffer C. The working buffer A includes five pass 2 overflow storage registers. One pass 2 overflow storage register for each of the five DIF blocks in a video segment. Each pass 2 overflow storage register includes a dct_done field, an overflow bit count field, and an overflow word count field.

The pass 1 engine 320 and pass 2 engine 330 include circuitry that updates the dct_done field, the overflow bit count field, and the overflow word count field based on the amount of overflow data detected during the pass which is detected in the search for DCT components stored in the DIF sequence data storage areas. Pass 1 engine 320 creates pass 2 overflow data (used by pass 2), and pass 2 engine 330 creates pass 3 overflow data (used by pass 3). The pass 2 engine 330 and pass 3 engine 340 update circuitry maintains the overflow bit count field and the overflow word count field to keep track of the amount of data left in the overflow area during each step of the process.

The code register and valid count storage for DIF blocks 0-4 storage registers provides the saved state of the last unrecoverable code by storing the state of the code register at the time of the event as well as the number of valid bits within the code register. Following passes of the VLD engine 210 use this stored state as a beginning in the search for EOBs to complete the DCT component. In this manner the decode process can progress without copying the entire macro block back to memory (i.e. one pass picks up where the last one left off). P2062 * 0 PATENT The working buffer A, working buffer B, and working buffer C afford parallel operation of the VLD engine 210. As the pass 2 engine 330 processes the overflow data and the state of the incomplete DCTs stored by pass 1 in the pass 2 overflow storage, the pass 1 engine 320 begins detection of another DCT component corresponding to each of the 5 DIF blocks of a second video segment stored in the DIF sequence data storage 402. Similarly, as the pass 3 engine 340 starts processing the pass 2 and pass 3 overflow areas along with the original DIF sequence data to create the final inverse quantized run-amp pairs, pass 2 engine 330 starts the decode process on the results from pass 1. The pass 2 engine 330 and the pass 3 engine 340 completes the DCTs via concatenation of the overflow data to the state that was saved when an unrecoverable code was detected.

For example, Pass 1 saves off overflow data and saved states; pass 2 uses the saved state and the pass 2 overflow data from Pass 1 to detect EOBs. If 6 EOBs are detected for a macro block (one for each DCT) then whatever is left in the pass 2 overflow buffer is transferred to the pass 3 overflow buffer area, and the amount of data stored in the pass 2 overflow buffer is updated. Pass 3 uses the initial DIF sequence data and the pass 2 and pass 3 overflow data to finish the process. All of this happens in parallel with each pass working on a different video segment.

Stated differently, the pass 2 engine 330 detects DCT components from the pass 2 overflow storage registers of working buffer A and stores any incomplete DCT components in the pass 3 overflow storage register of the working buffer A. As the pass 3 engine 340 operates on the pass 3 overflow storage register of the working buffer A, the pass 2 engine 330 operates on the pass 2 overflow storage buffers of working buffer B, and the pass 1 engine 320 operates on a third video segment from the DIF sequence data storage 402 and updates the pass 2 overflow storage registers of the working buffer C. Thus, the pass 1 engine 320, pass 2 engine 330, and the pass 3 engine 340 operates in parallel to maintain high efficiency in the performance of the VLD engine 210.

Figure 5:
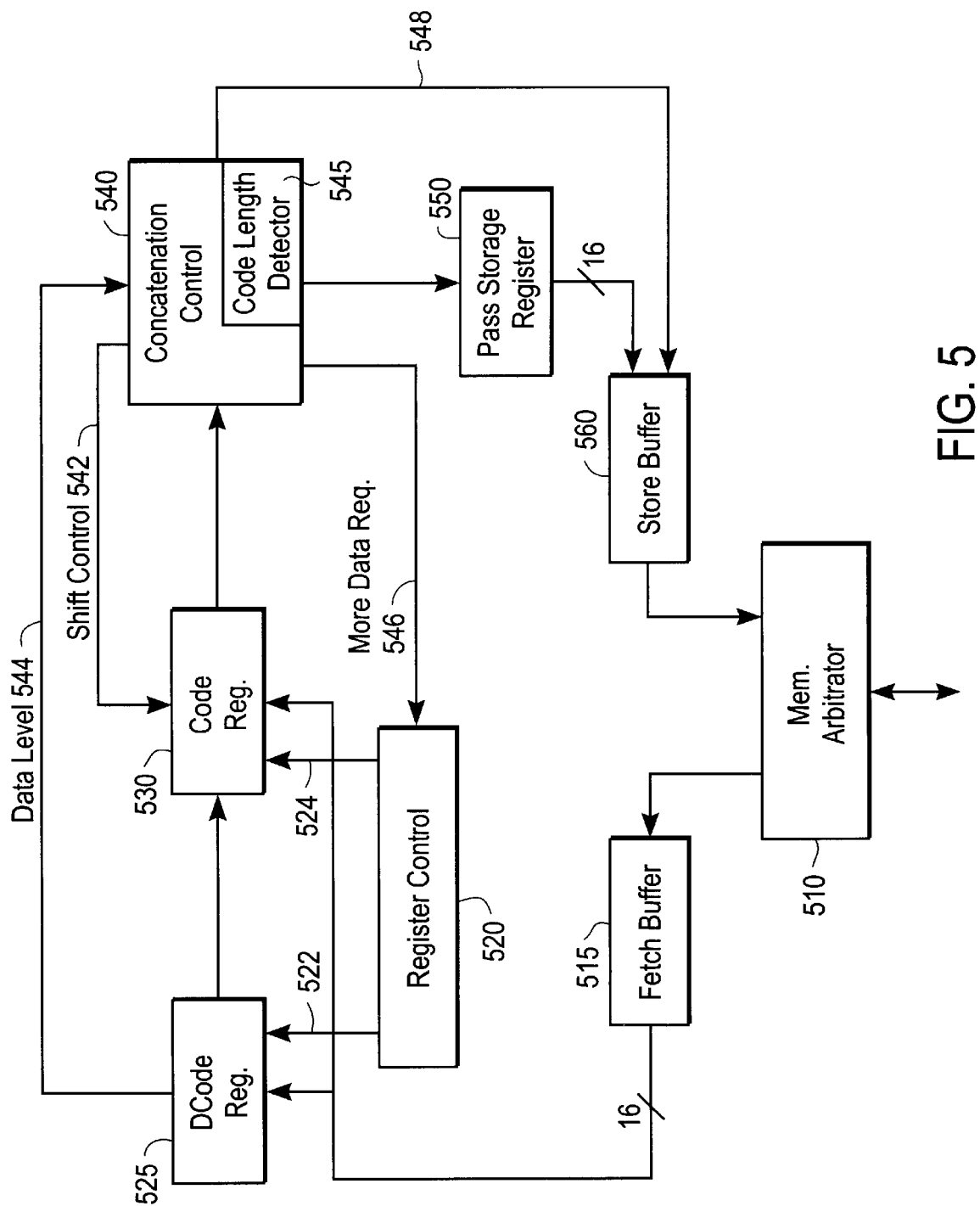
FIG. 5 illustrates a block diagram of a pass 1 engine and a pass 2 engine in accordance to the present invention.

FIG. 5 illustrates a block diagram of the pass 1 engine 320 which is also illustrative of the pass 2 engine 330. The pass 1 engine 320 and the pass 2 engine 330 are similarly implemented and thus the description for the pass 1 engine 320 applies to the pass 2 engine 330 with exceptions to obvious differences. The pass 1 engine 320 includes a memory arbitrator 510, a fetch buffer 515, a register controller 520, a precode register 525, code register 530, a concatenation controller 540, a pass storage register 550, and a store buffer 560. The fetch buffer 515 seamlessly fetches a next data word from the memory 310 via the memory arbitrator 510 whenever the fetch buffer 515 empties. Because the variable length code is from 3 to 16 bits in length, each data word and registers of the pass 1 engine 320 and the pass 2 engine 330 are 16 bits wide.

The register controller 520 via control lines 522 and 524 loads a data word to the precode register 525 and the code register 530, respectively. The concatenation controller 540 includes code length detector circuitry 545 that detects the code length of the variable length code. Once the code length is determined, the concatenation controller 540 issues a shift control signal 542 that serially shifts the data in the precode register 525 and code register 530 by the code length. The concatenation controller 540 receives a data level signal 544 from the precode register 525 that monitors the number of bits remaining in the precode register 525. If the shift length is greater than the amount of data remaining in the precode register 525, the concatenation controller 540 shifts the remaining data in the precode register 525 and issues a more data request on line 546 to the register controller 520 to load another data word to the precode register. Once another data word is loaded to the precode register, the concatenation controller 540 shifts the remaining amount of the data indicated by the code word length. In this way, the 16 bit word length is maintained.

The concatenation controller 540 continues shifting data until an EOB is detected or no more data is left in the DCT component data area. A no data event occurs when the code length detected is greater than the number of valid bits in the code register 530. The concatenation controller 540 stores the state of the code register 530 to the store buffer 560 via line 548. The memory arbitrator 510 stores the state of the code register 530 to the code register and valid count storage (i.e. state storage area) for the particular DIF block to a working buffer area of the memory 310.

When the concatenation controller 540 detects an EOB, if there is data between the EOB and the end of the DCT component data area, the data is shifted to the pass storage register 550 until the data in the pass storage register 550 reaches 16 bits (pass 1 only). At which instant, the data is transferred to the store buffer 560 for transfer to a particular DIF block pass 2 overflow storage register in the memory 310. The concatenation controller 540 continues to shift data to the pass storage register until the end of the DCT component data area.

Referring again to FIG. 4, a separate pass 2 overflow storage register is maintained for each of the 5 DIF blocks in a video segment. By transferring to the memory 310 when the contents of the pass storage register 550 reaches 16 bits, the pass 1 engine 320 maintains a word access format to the memory 310 which reduces the number of writes to the memory by the memory arbitrator 510. The concatenation controller 540 also updates the dct_done field, the overflow bit count field, and overflow word count field of the particular DIF block pass 2 overflow storage register. However, in the case where the amount of data between an EOB and the end of the DCT component data area are a few bits, then the data from this DCT component and another DCT component are concatenated together to maintain complete data words by using the storage register as a temporary storage element. Maintenance of complete 16 bit words provides for an efficient memory update mechanism since read-modify-write cycles are not required.

Referring back to FIG. 5, the pass 2 engine 330 operates similar to the pass 1 engine 320. However, in the pass 2 engine, the fetch buffer 515 seamlessly fetches code data first from the code register and valid count storage register then data words from a particular DIF block pass 2 overflow storage of the memory 310 via the memory arbitrator 510.

The register controller 520 via control lines 522 and 524 loads the data words to the precode register 525 and the code register 530, respectively. The concatenation controller 540 includes code length detector circuitry 545 that detects the code length of the variable length code. Once the code length is determined, the concatenation controller 540 issues a shift control signal 542 that serially shifts the data in the precode register 525 and code register 530 by the code length. The concatenation controller 540 receives a data level signal 544 from the precode register 525 that monitors the number of bits remaining in the precode register 525. If the shift length is greater than the amount of data remaining in the precode register 525, the concatenation controller 540 shifts the remaining data in the precode register 525 and issues a more data request on line 546 to the register controller 520 to load another data word to the precode register. Once loaded, the concatenation controller 540 shifts the remaining amount of the data indicated by the code word length. In this way, the 16 bit word length is maintained.

The concatenation controller 540 continues shifting data until an EOB is detected or no more data is left in the DCT component data area. In the case of an EOB detection, any data remaining between the EOB code and the end of the DCT component area is stored into the overflow area (pass 1) or if all the DCT components in a macro block were completed (pass 2) any remaining data in the pass 2 overflow area is transferred to the pass 3 overflow area. In the case of no more data in pass 1, the state is stored and processing goes to the next DCT component area. In the case of no more data in pass 2, the processing continues in the next DCT component area. A no data event occurs when the code length detected is greater than the number of valid bits in the code register 530. The concatenation controller 540 updates the state of the code register 530 to the store buffer 560 via line 548. The memory arbitrator 510 in turn stores the state of the code register 530 to the pass 3 overflow storage register in the memory 310. A search for the next incomplete DCT component of the particular DIF block is performed until all DCT components for all of the DIF blocks are searched.

In the case when the concatenation controller 540 detects an EOB, the concatenation controller 540 updates the DCT component as complete and the concatenation controller 540 searches for other incomplete DCT components. If all of the DCT components are complete and there are data remaining in the pass 2 overflow storage register for the particular DCT block or the code register 530, the remaining data is moved to the pass storage register 550 for storage to the pass 3 overflow storage register in the memory 310.

Figure 6:
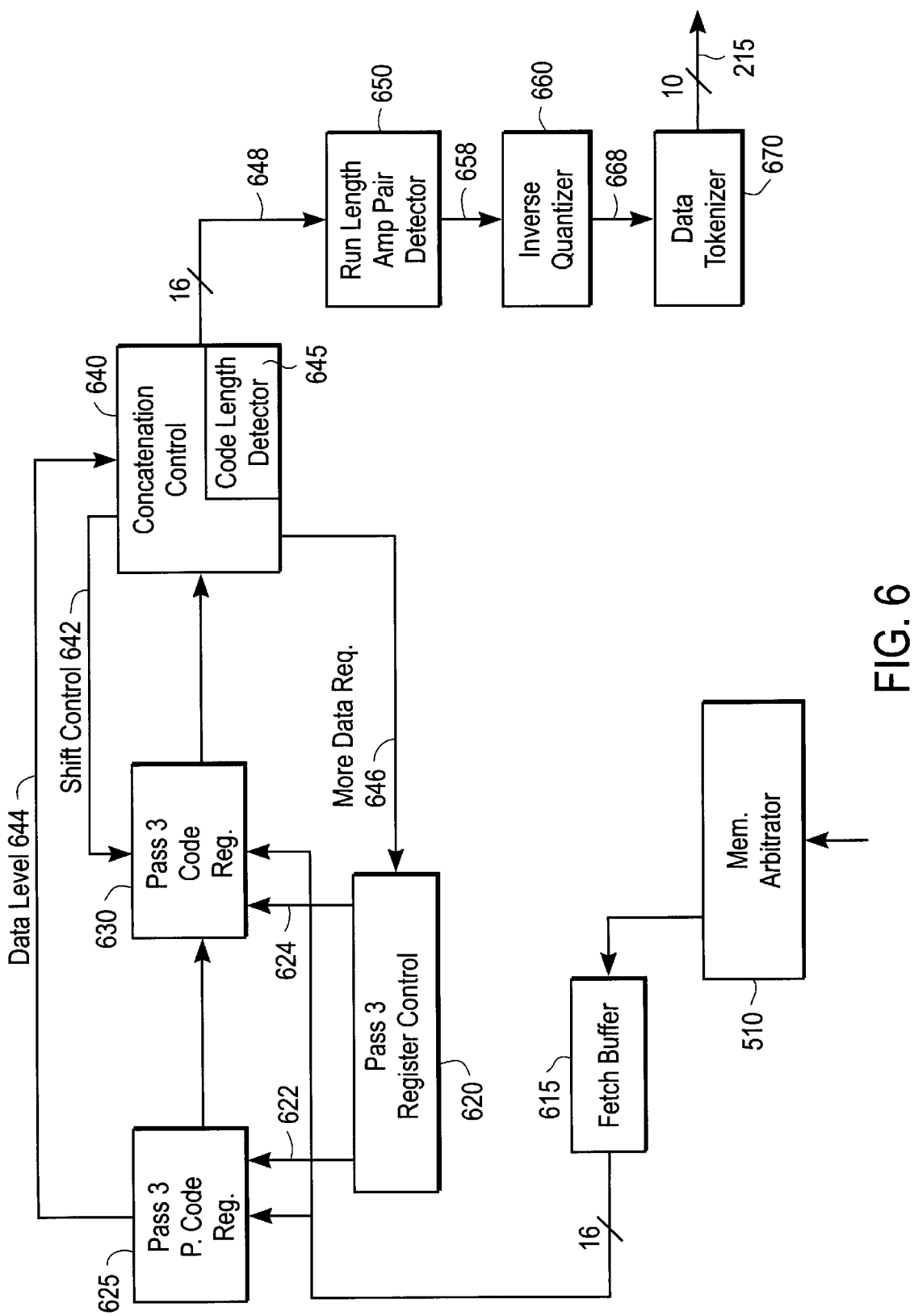
FIG. 6 illustrates a block diagram of a pass 3 engine in accordance to the present invention.

FIG. 6 illustrates a block diagram of the pass 3 engine 340. The pass 3 engine 340 includes the memory arbitrator 510, a fetch buffer 615, a register controller 620, a precode register 625, code register 630, a concatenation controller 640, a run-length amp pair detector 650, inverse quantizer 660, and a data tokenizer 670. Because the variable length code is from 3 to 16 bits in length, each data word and registers of the pass 3 engine 340 are 16 bits wide. The fetch buffer 615 seamlessly fetches a next data word from the memory 310 via the memory arbitrator 510 whenever the fetch buffer 615 empties. The pass 3 engine 340 starts with the same raw data as the pass 1 engine 320 which reduces both the memory footprint and memory accesses due to data copying of the memory 310.

The register controller 620 via control lines 622 and 624 loads a data word to the precode register 625 and the code register 630, respectively. The concatenation controller 640 includes code length detector circuitry 645 that detects the code length of the variable length code. Once the code length is determined, the concatenation controller 640 issues a shift control signal 642 that serially shifts the data in the precode register 625 and code register 630 by the code length. The concatenation controller 640 receives a data level signal 644 from the precode register 625 that monitors the number of bits remaining in the precode register 625. If the shift length is greater than the amount of data remaining in the precode register 625, the concatenation controller 640 shifts the remaining data in the precode register 625 and issues a more data request on line 646 to the register controller 620 to load another data word to the precode register. Once loaded, the concatenation controller 640 shifts the remaining amount of the data indicated by the code word length. In this way, the 16 bit word length is maintained reducing overhead associated with multiple accesses to the memory 310.

The concatenation controller 640 continues shifting data until an EOB is detected or no more data is left in the DCT component data area. A no data event occurs when the code length detected is greater than the number of valid bits in the code register 630. If there is pass 2 overflow storage register data, the concatenation controller 640 concatenates the data of the pass 2 overflow storage register data to any data left in the code register 630 and continues processing until an EOB is detected or until the pass 2 overflow storage register data runs out. When the pass 2 overflow storage register data runs out, the concatenation controller 640 concatenates the data of the pass 3 overflow storage register and continues processing until an EOB is detected or until the pass 3 overflow storage register data runs out.

Whenever the concatenation controller 640 detects an EOB which indicates detection of a DCT component, an EOB code is sent advancing a main data pointer to the next DCT component where a search for additional EOBs continues. The concatenation controller 640 provides variable length coded data having contiguous DCT blocks on line 648. The contiguous DCT blocks include the complete set of the DCTs. The run-length amp pair detector 650 receives the contiguous DCT blocks and decodes the DCT blocks to provide run length amp pairs of the DCT blocks on line 658. The inverse quantizer 660 inverse quantizes the quantized amplitude values of the run length amp pair and provides run length and inverse quantized amplitude values on line 668. The run length and inverse quantized amplitude values include unmodified DC coefficient and header information that the data tokenizer 670 formats into a series of 10-bit fields on line 215. The data tokenizer 670 sign extends the 9-bit fields to provide 10-bit fields. The video decoder 220 receives the series of 10-bit fields on line 215 for conversion to video display data.

In particular, sign extension is performed by looking at the most significant bit of the 9 bit data field. If this bit is set then bit 10 is also set. The video decoder 220 then performs a similar process by looking at the most significant bit of the 10 bit field and sign extending out to 16 bits.

In the present embodiment, the three pass execution of the VLD engine 210 operates until all 27 video segments of a DIF sequence stored in a DIF sequence data storage of the memory 310 have been processed. Each pass of the three pass process is optimized as to the number of times data is required to be concatenated together to form a useful data element. This is accomplished by maintaining data which is less than 16 bits in local registers between process states such that the next state is not required to refetch the data from memory in order to build up a complete data element (i.e. valid code word). Moreover the memory interface (reads and writes) are maintained on word boundaries such that no read-modify-write cycles are required for storage of continuous data structures.

Figure 7:
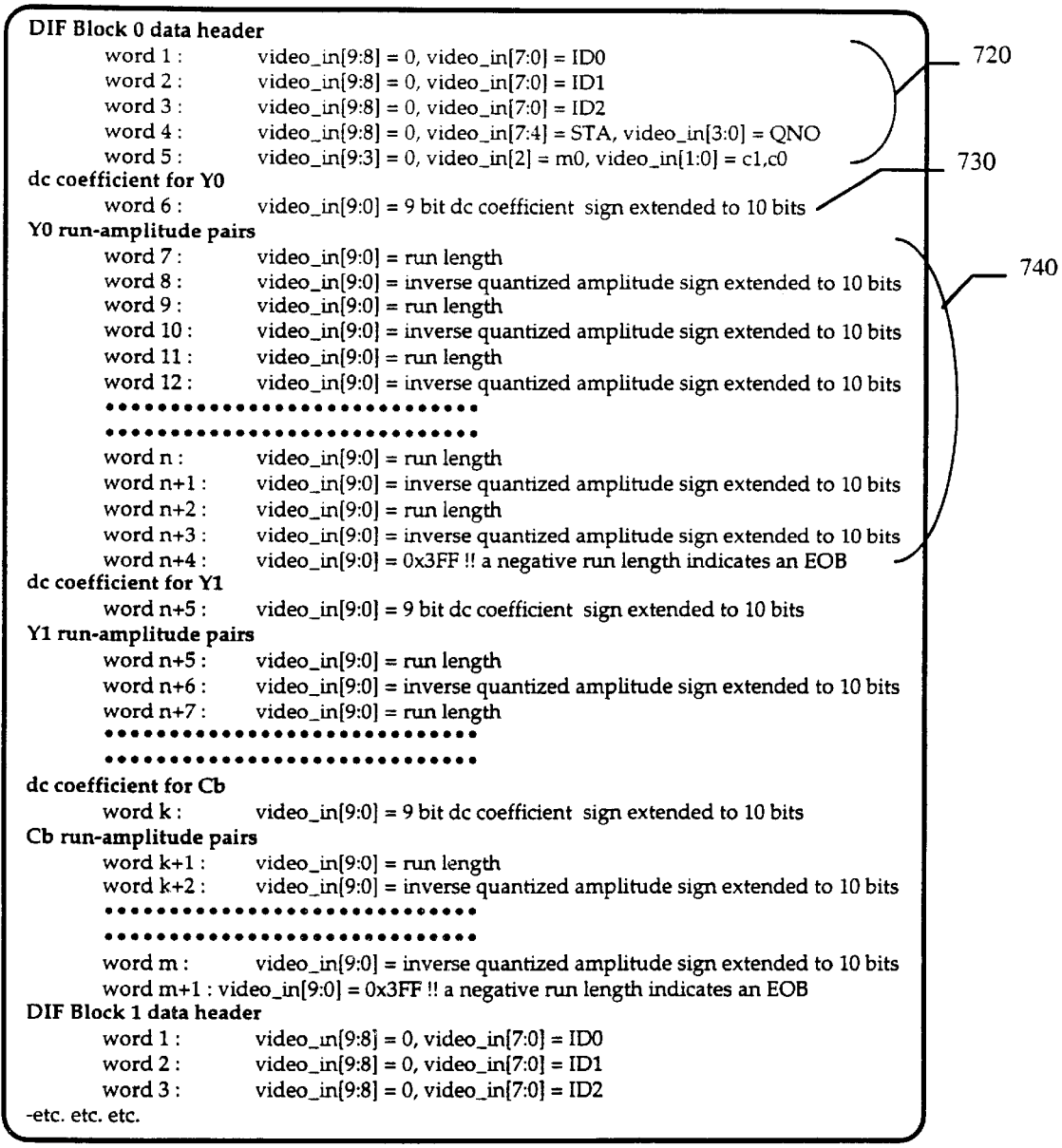
FIG. 7 illustrates the VLD engine output stream format.

FIG. 7 illustrates the format of an output stream of a series of 10 bit fields decoded from the variable length coded DVC data of the VLD engine 210. For example, referring to the DIF block 0 data header 720, words 1–5 correspond to the four bytes of the DIF block identification, macro block status and quantization number data of the DIF block from FIG. 9. Similarly, word 6 730 represents dc component of Y0 of the DIF block from FIG. 9, and section 740, representing word 7 through word n+4, corresponds to the AC coefficient data of Y0 from FIG. 9. Thus, the output stream represented by a series of 10 bit fields from the VLD engine 210 provides contiguous DCT components (including system layer data) from non-contiguous variable length coded data. This placement of the system data (e.g. class code, 2–4×8 or 8×8 DCT indication, quantization number) allows for efficient processing by the downstream video decoder 220.

Figure 8:
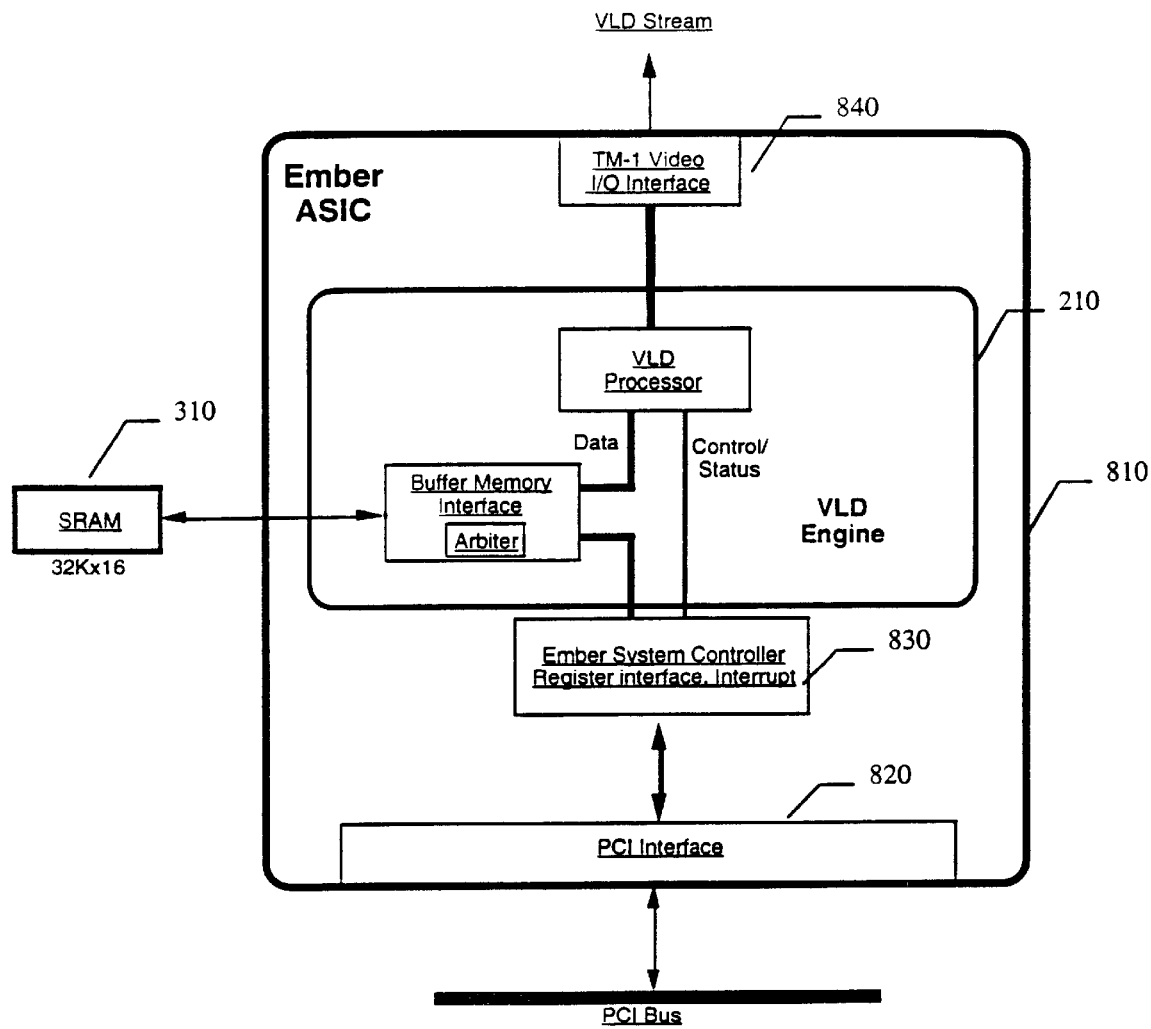
FIG. 8 illustrates a block diagram of a system implementation of the VLD engine within an Ember ASIC in accordance with the present invention.

FIG. 8 illustrates a block diagram of a system implementation of the VLD engine 210 within an Ember ASIC 810. The Ember ASIC 810 includes a PCI interface 820, an Ember system controller 830, the VLD engine 210, and a TM-1 video interface 840. Once a DIF sequence has been loaded to the memory 310, a write to two area select control bits and a start bit of the Ember system controller 830 via the PCI interface 820 starts the VLD engine 210. As the VLD engine 210 processes the DIF sequence, an Ember status bit remains true. When the VLD engine 210 completes the DIF sequence, the Ember status bit is set false indicating that the VLD engine 210 is not busy. The Ember system controller 830 conditionally generates an interrupt to the TM-1 interface 840 or the PCI interface 820 when the DIF sequence has been processed. The Ember system controller 830 loads a next DIF sequence while the VLD engine 210 operates on a current DIF sequence in the memory 310 which maintains efficient operation of the VLD engine 210.

The video decoder 220 coupled to the TM-1 video interface 840 processes the DIF sequence based on the data type. In general, the header information of the VLD engine 210 output stream verifies that the data is correctly sequenced for further processing. The DC coefficient, run length, and inverse quantized amplitude data completes the 64 entries in an 8×8 or 2–4×8 DCT. The video decoder 220 performs an inverse DCT then scales and inverse weights the data to derive final luminance and chrominance pixel values. Finally, the video decoder 220 reshuffles the image to the original format for transmission of the video display data on line 225.

While the foregoing detailed description has described several embodiments of the apparatus and methods for a DVC decode system in accordance with this invention, it is to be understood that the above description is illustrative only and not limiting of the disclosed invention. Obviously, many modifications and variations will be apparent to the practitioners skilled in this art. Accordingly, the apparatus and methods of a DVC decode system has been provided. The DVC decode system includes a VLD engine that reformats DIF sequences of variable length code to provide a data stream of decoded data for efficient transfer and downstream processing by an video decoder of the DVC decode system.

What is claimed is:

1. A variable length decode engine operative to receive a video frame having a plurality of digital interchange format (DIF) sequences including a plurality of embedded AC coefficients, comprising:

a concatenation engine configured to contiguously format a plurality of DIF blocks of a DIF sequence to provide contiguous DCT blocks;

a run-length amp pair generator coupled to the concatenation engine configured to decode the contiguous DCT blocks to provide run-length amp pairs; and a DIF sequence data storage configured to store a plurality of DIF blocks having a plurality of DCT components wherein the concatenation engine includes:

a pass 1 engine coupled to the DIF sequence data storage to detect a DCT component and store remaining DCT components to a pass 2 overflow storage register of the DIF data storage;

a pass 2 engine coupled to the pass 2 overflow storage register to detect complete DCT components from the remaining DCT components of the pass 2 overflow storage register and store incomplete DCT components to a pass 3 overflow storage register of the DIF sequence data storage; and a pass 3 engine coupled to the DIF sequence data storage, the pass 2 overflow storage register, and the pass 3 overflow storage register to contiguously format the plurality of DIF components from the DIF sequence data storage, the pass 2 overflow storage register, and the pass 3 overflow storage, respectively to provide the contiguous DCT blocks.

2. The variable length decode engine of claim 1, wherein the pass 1 engine, the pass 2 engine, and the pass 3 engine operate in parallel.

3. The variable length decode engine of claim 1, wherein the pass 1 engine includes:
   a shift register coupled to the DIF sequence data storage to receive variable length coded data from a DCT component of a DIF block; and
   a pass 1 concatenation controller coupled to the DIF sequence data storage and the shift register to shift the variable length coded data of the DCT component area until:
      an end of block (EOB) is detected indicating detection of a DCT component whereupon the pass 1 concatenation controller stores any remaining variable length coded data of the shift register and the DCT components to the pass 2 overflow storage register; or
      no more valid data is left in the DIF sequence data storage whereupon the pass 1 controller stores any remaining variable length data of the shift register to the pass 2 overflow storage register.

4. The variable length decode engine of claim 1, wherein the pass 2 engine includes:
   a second shift register coupled to the pass 2 overflow storage register to receive variable length data; and
   a pass 2 concatenation controller coupled to the second shift register to shift the variable length data from the pass 2 overflow storage register until an end of block (EOB) is detected indicating detection of a DCT component whereupon the pass 2 concatenation controller continues to shift the variable length coded data to detect additional EOBs associated with other DCT components until completion of the variable length coded data stored in the pass 2 overflow storage register whereupon the pass 2 concatenation controller stores any remaining variable length coded data in the second shift register and the pass 2 overflow storage register to the pass 3 overflow storage.

5. The variable length decode engine of claim 1, wherein the pass 3 engine includes:
   a third shift register coupled to the DIF sequence data storage, the pass 2 overflow storage register, and the pass 3 overflow storage register to receive variable length coded data;
   a pass 3 concatenation controller coupled to the third shift register to shift the variable length coded data from the DIF sequence data storage, the pass 2 overflow storage register, and the pass 3 overflow storage register, respectively until an end of block (EOB) is detected indicating detection of a DCT component whereupon the third concatenation controller advances to another DCT component and shifts the variable length coded data to detect additional EOBs associated with other DCT components until completion of the variable length coded data; and
   the run-length amp pair generator is coupled to the pass 3 concatenation controller and configured to decode detected DCT components from the pass 3 concatenation controller to provide run-length amp pairs representing a number of consecutive zero AC coefficients and an amplitude representing a magnitude of a non-zero AC coefficient.

6. The variable length decode engine of claim 1 wherein a run-length amp pair includes a codeword having a run-length representing a number of consecutive zero AC coefficients and an amplitude representing a magnitude of a non-zero AC coefficient.

7. The variable length decode engine of claim 6 further comprising as inverse quantizer engine coupled to the run-length map pair generator configured to inverse quantize the non-zero AC coefficients.

8. The variable length decode engine of claim 1 wherein the DIF sequences includes header DIF blocks, audio DIF blocks, video DIF blocks, and system DIF blocks and the concatenation engine skips non-video DIF blocks.

9. A method of decoding variable length coded data having a plurality of digital interchange format (DIF) sequences including a plurality of DIF blocks comprising:
   formatting contiguously the plurality of DIF blocks to provide contiguous DCT blocks;
   decoding the contiguous DCT blocks to provide run-length amp pairs; and
   providing a DIF sequence data storage configured to store a plurality of DIF blocks having a plurality of DCT components wherein the act of formatting contiguously the plurality of DIF blocks includes:
      detecting a complete DCT component from the plurality of DCT components stored in the DIEF sequence data storage;
      storing remaining DCT components to a pass 2 storage register in the DIF sequence data storage;
      detecting complete DCT components from the pass 2 storage register;
      storing incomplete DCT components to a pass 3 storage register in the DIF sequence data storage; and
      formatting the DCT components to provide the contiguous DCT blocks from the plurality of DCT components stored in the DIF sequence data storage, the pass 2 storage register, and the pass 3 storage register, respectively.

10. The method of decoding variable length coded data according to claim 9, wherein the step of formatting the DCT components includes the steps:
    detecting DCT components from the plurality of DCT components stored in a main DIF sequence data storage of the DIF sequence data storage;
    concatenating the remaining DCT components of the pass 2 register when DCT component data stored in the main DIF sequence data storage is exhausted;
    detecting DCT components from the remaining DCT components of the pass 2 register;
    concatenating the incomplete DCT components of the pass 3 register when the DCT component data of the pass 2 register is exhausted; and
    detecting DCT components from the incomplete DCT components of the pass 3 register.

11. The method of decoding variable length coded data according to claim 10, wherein the step of detecting DCT components includes the step detecting end of blocks (EOBs) corresponding to the DCT components.

12. The method of decoding variable length coded data according to claim 9 further comprising the step generating run-length amp pairs from the contiguous DCT blocks.

13. The method of decoding variable length coded data according to claim 12 further comprising the step inverse quantizing AC coefficients to generate the run-length amp pairs.

14. A computing system having an input and output for transceiving video frames including a plurality of digital interchange format (DIF) sequences, comprising:

a digital video cassette (DVC) device coupled to the input configured to provide the video frames;

a concatenation engine configured to receive the video frames and contiguously format a plurality of DIF blocks of a DIF sequence to provide contiguous DCT blocks;

a run-length amp pair generator coupled to the concatenation engine configured to decode the contiguous DCT blocks to provide run-length amp pairs;

a video decoder coupled to the run-length amp pair generator configured to decode the run-length amp pairs;

a display controller coupled to the video decoder configured to display decoded run-length amp pairs; and a DIF sequence data storage configured to store a plurality of DIF blocks having a plurality of DCT components wherein the concatenation engine includes:

a pass 1 engine coupled to the DIF sequence data storage to detect a DCT component and store remaining DCT components to a pass 2 storage register of the DIF sequence data storage;

a pass 2 engine coupled to the pass 2 storage register engine to detect complete DCT components from the remaining DCT components of the pass 2 storage register and store incomplete DCT components to a pass 3 storage register of the DIF sequence data storage; and a pass 3 engine coupled to the DIF sequence data storage, the pass 2 storage register, and the pass 3 storage register to contiguously format the plurality of DIF components from the DIF sequence data storage to provide the contiguous DCT blocks.

15. The computing system of claim 14, wherein the pass 3 engine includes:

a shift register coupled to the DIF sequence data storage, the pass 2 overflow storage register, and the pass 3 overflow storage register to receive variable length coded data; and a pass 3 concatenation controller coupled to the shift register to shift the variable length coded data of the DIF sequence data storage, the pass 2 overflow storage register, and the pass 3 overflow storage register, respectively until an end of block (EOB) is detected indicating detection of a DCT component whereupon the third concatenation controller advances to another DCT component and shifts the variable length coded data to detect additional EOBs associated with other DCT components until completion of the variable length coded data.

16. The computing system of claim 14 further comprising a firewire coupled between the DVC device and the input configured to transfer the video frames.

17. The computing system of claim 14 further comprising a video recording device coupled to the output of the computing system configured to record the decoded video frames.

18. A variable length decode engine operative to receive a video frame having a plurality of digital interchange format (DIF) sequences including a plurality of embedded AC coefficients, comprising:

a concatenation engine configured to contiguously format a plurality of DIF blocks of a DIF sequence to provide contiguous DCT blocks; and a run-length amp pair generator coupled to the concatenation engine configured to decode the contiguous DCT blocks to provide run-length amp pairs, a DIF sequence data storage configured to store a plurality of DIF blocks having a plurality of DCT components wherein the concatenation engine includes:

a pass 1 engine coupled to the DIF sequence data storage to detect a DCT component and store remaining DCT components to a pass 2 overflow storage register of the DIF data storage;

a pass 2 engine coupled to the pass 2 overflow storage register to detect complete DCT components from the remaining DCT components of the pass 2 overflow storage register and store incomplete DCT components to a pass 3 overflow storage register of the DIF sequence data storage; and a pass 3 engine coupled to the DIF sequence data storage, the pass 2 overflow storage register, and the pass 3 overflow storage register to contiguously format the plurality of DIF components from the DIF sequence data storage, the pass 2 overflow storage register, and the pass 3 overflow storage, respectively to provide the contiguous DCT block, wherein the pass 1 engine, the pass 2 engine, and the pass 3 engine operate in parallel.

19. The variable length decode engine of claim 18, wherein the pass 1 engine includes: a shift register coupled to the DIF sequence data storage to receive variable length coded data from a DCT component of a DIF block; and a pass 1 concatenation controller coupled to the DIF sequence data storage and the shift register to shift the variable length coded data of the DCT component area until:

an end of block (EOB) is detected indicating detection of a DCT component whereupon the pass 1 concatenation controller stores any remaining variable length coded data of the shift register and the DCT components to the pass 2 overflow storage register; or no more valid data is left in the DIF sequence data storage whereupon the pass 1 controller stores any remaining variable length data of the shift register to the pass 2 overflow storage register.

20. The variable length decode engine of claim 18, wherein the pass 2 engine includes:

a second shift register coupled to the pass 2 overflow storage register to receive variable length data; and a pass 2 concatenation controller coupled to the second shift register to shift the variable length data from the pass 2 overflow storage register until an end of block (EOB) is detected indicating detection of a DCT component whereupon the pass 2 concatenation controller continues to shift the variable length coded data to detect additional EOBs associated with other DCT components until completion of the variable length coded data stored in the pass 2 overflow storage register whereupon the pass 2 concatenation controller stores any remaining variable length coded data in the second shift register and the pass 2 overflow storage register to the pass 3 overflow storage.

21. The variable length decode engine of claim 18, wherein the pass 3 engine includes:

a third shift register coupled to the DIF sequence data storage, the pass 2 overflow storage register, and the pass 3 overflow storage register to receive variable length coded data;

a pass 3 concatenation controller coupled to the third shift register to shift the variable length coded data from the DIF sequence data storage, the pass 2 overflow storage register, and the pass 3 overflow storage register, respectively until an end of block (EOB) is detected indicating detection of a DCT component whereupon the third concatenation controller advances to another DCT component and shifts the variable length coded data to detect additional EOBs associated with other DCT components until completion of the variable length coded data; and the run-length amp pair generator is coupled to the pass 3 concatenation controller and configured to decode detected DCT components from the pass 3 concatenation controller to provide run-length amp pairs representing a number of consecutive zero AC coefficients and an amplitude representing a magnitude of a non-zero AC coefficient.

22. A method of decoding variable length coded data having a plurality of digital interchange format (DIF) sequences including a plurality of DIF blocks comprising the steps:

formatting contiguously the plurality of DIF blocks to provide contiguous DCT blocks; and decoding the contiguous DCT blocks to provide run-length amp pairs;

a DIF sequence data storage configured to store a plurality of DIF blocks having a plurality of DCT components wherein the step of formatting contiguously the plurality of DIF blocks includes the steps:

detecting a complete DCT component from the plurality of DCT components stored in the DIF sequence data storage;

storing remaining DCT components to a pass 2 storage register in the DIF sequence data storage;

detecting complete DCT components from the pass 2 storage register;

storing incomplete DCT components to a pass 3 storage register in the DIF sequence data storage; and formatting the DCT components to provide the contiguous DCT blocks from the plurality of DCT components stored in the DIF sequence data storage, the pass 2 storage register, and the pass 3 storage register, respectively.

23. The method of decoding variable length coded data according to claim 22, wherein the step of formatting the DCT components includes the steps:

detecting DCT components from the plurality of DCT components stored in a main DIF sequence data storage of the DIF sequence data storage;

concatenating the remaining DCT components of the pass 2 register when DCT component data stored in the main DIF sequence data storage is exhausted; detecting DCT components from the remaining DCT components of the pass 2 register.

24. A computing system having an input and output for transceiving video frames including a plurality of digital interchange format (DIF) sequences, comprising:

a digital video cassette (DVC) device coupled to the input configured to provide the video frames;

a concatenation engine configured to receive the video frames and contiguously format a plurality of DIF blocks of a DIF sequence to provide contiguous DCT blocks; and a run-length amp pair generator coupled to the concatenation engine configured to decode the contiguous DCT blocks to provide run-length amp pairs; and a video decoder coupled to the run-length amp pair generator configured to decode the run-length amp pairs;

a display controller coupled to the video decoder configured to display decoded run-length amp pairs;

a DIF sequence data storage configured to store a plurality of DIF blocks having a plurality of DCT components wherein the concatenation engine includes:

a pass 1 engine coupled to the DIF sequence data storage to detect a DCT component and store remaining DCT components to a pass 2 storage register of the DIF sequence data storage;

a pass 2 engine coupled to the pass 2 storage register engine to detect complete DCT components from the remaining DCT components of the pass 2 storage register and store incomplete DCT components to a pass 3 storage register of the DIF sequence data storage; and a pass 3 engine coupled to the DIF sequence data storage, the pass 2 storage register, and the pass 3 storage register to contiguously format the plurality of DIF components from the DIF sequence data storage to provide the contiguous DCT blocks.

25. The computing system of claim 24, wherein the pass 3 engine includes:

a shift register coupled to the DIF sequence data storage, the pass 2 overflow storage register, and the pass 3 overflow storage register to receive variable length coded data; and a pass 3 concatenation controller coupled t the shift register to shift the variable length coded data of the DIF sequence data storage, the pass 2 overflow storage register, and the pass 3 overflow storage register, respectively until an end block (EOB) is detected indicating of a DCT component whereupon the third concatenation controller advances to another DCT component and shifts the variable length coded data to detect additional EOBs associated with other DCT components until completion of the variable length coded data.

26. The computing system of claim 24 further comprising a firewire coupled between the DVC device and the input configured to transfer the video frames.

27. The computing system of claim 24 further comprising a video recording device coupled to the output of the computing system configured to record the decoded video frames.

28. A method comprising:

receiving variable length coded data having a plurality of digital interchange format (DIF) sequences including a plurality of DIF blocks;

identifying DCT components in a first portion of the variable length coded data during a first pass process; and enabling a second pass process to pickup where the first pass process left off by saving state information associated with the first pass process in a working buffer and saving unfinished DCT components data in the working buffer, wherein the second pass process identifies DCT components by concentrating the unfinished DCT component data in the working buffer with a second portion of the variable length coded data.

* * * * *